United States Patent
Sasahara

(10) Patent No.: US 6,742,102 B2
(45) Date of Patent: May 25, 2004

(54) MICROPROCESSOR AND CACHE CONTROLLING METHOD

(75) Inventor: Masashi Sasahara, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 40 days.

(21) Appl. No.: 09/818,611

(22) Filed: Mar. 28, 2001

(65) Prior Publication Data

US 2001/0027510 A1 Oct. 4, 2001

(30) Foreign Application Priority Data

Mar. 28, 2000 (JP) ..................................... 2000-088972

(51) Int. Cl.[7] ............................................. G06F 12/08
(52) U.S. Cl. ..................... 711/204; 711/132; 711/137
(58) Field of Search ................................. 711/133, 137, 711/204, 213, 132; 712/207, 237

(56) References Cited

U.S. PATENT DOCUMENTS

| 5,043,870 A | * | 8/1991 | Ditzel et al. ................ 711/132 |
| 5,634,027 A | | 5/1997 | Saito ................................ 711/3 |
| 5,822,757 A | * | 10/1998 | Chi ............................... 711/129 |
| 5,835,967 A | * | 11/1998 | McMahan .................... 711/213 |
| 5,974,543 A | * | 10/1999 | Hilgendorf et al. .......... 712/240 |
| 6,076,158 A | * | 6/2000 | Sites et al. ................... 712/230 |
| 6,247,123 B1 | * | 6/2001 | Tran ............................. 712/239 |

FOREIGN PATENT DOCUMENTS

JP          5-143456          6/1993

* cited by examiner

*Primary Examiner*—Gary Portka
(74) *Attorney, Agent, or Firm*—Oblon, Spivak, McClelland, Maier & Neustadt, P.C.

(57) ABSTRACT

A microprocessor capable of suppressing reduction in performance caused due to a cache miss when a specific command is issued. The processor according to the present invention comprises a command buffer/queue; an execution unit; a subroutine call decoder; a data cache control unit; an Addiu decoder for detecting an addiu command; a pre-fetch control section; an adder; a PAdr register; a selector; and an adder circuit. When a subroutine call occurs, a stack pointer is moved by an amount used in a subroutine, and data used in the subroutine is pre-fetched to be stored in an area used by the subroutine in a data cache. Therefore, it is possible to reduce cache miss penalties due to stack access which is apt to be generated at the time of a subroutine call.

8 Claims, 6 Drawing Sheets

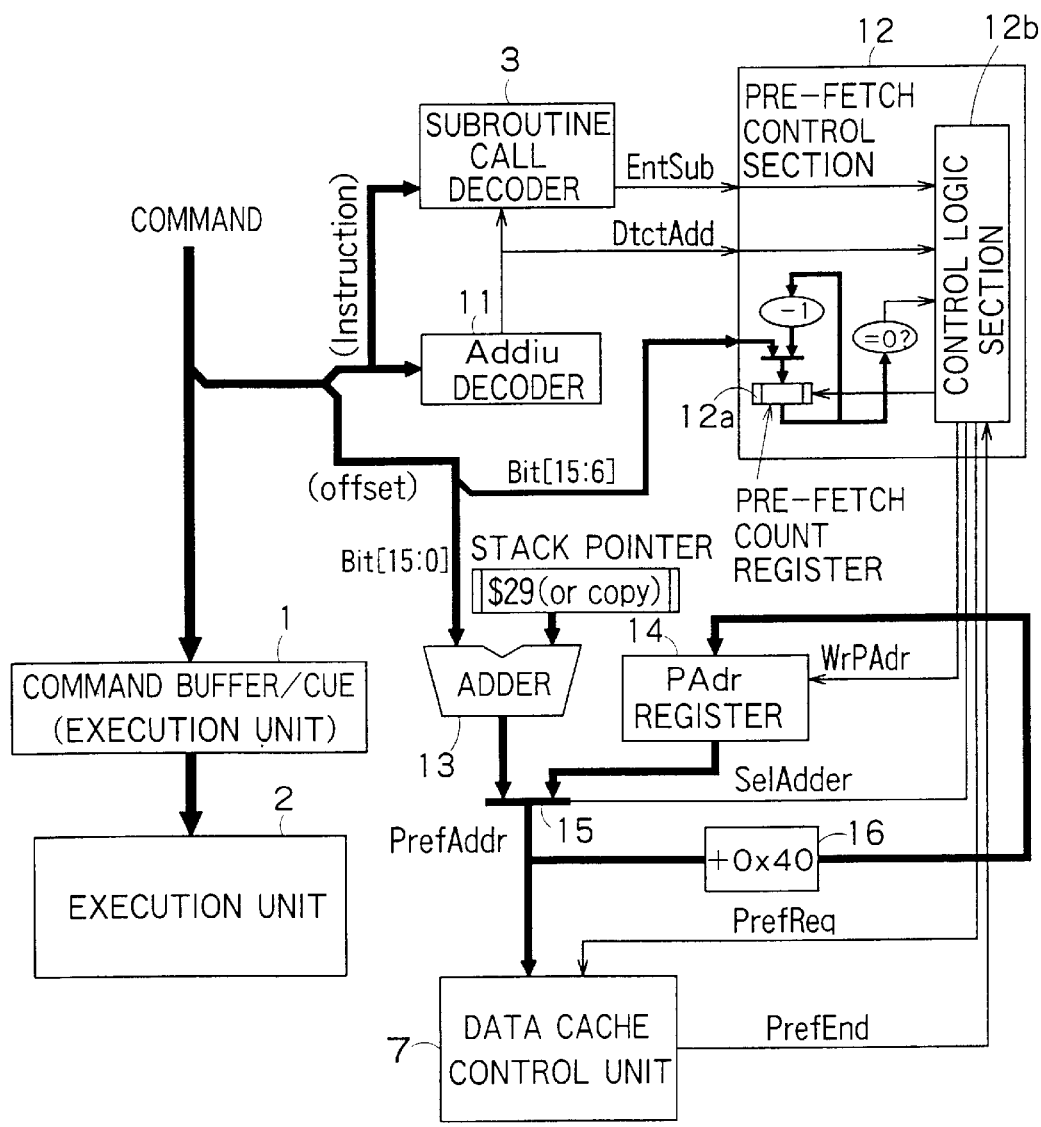
F I G. 3

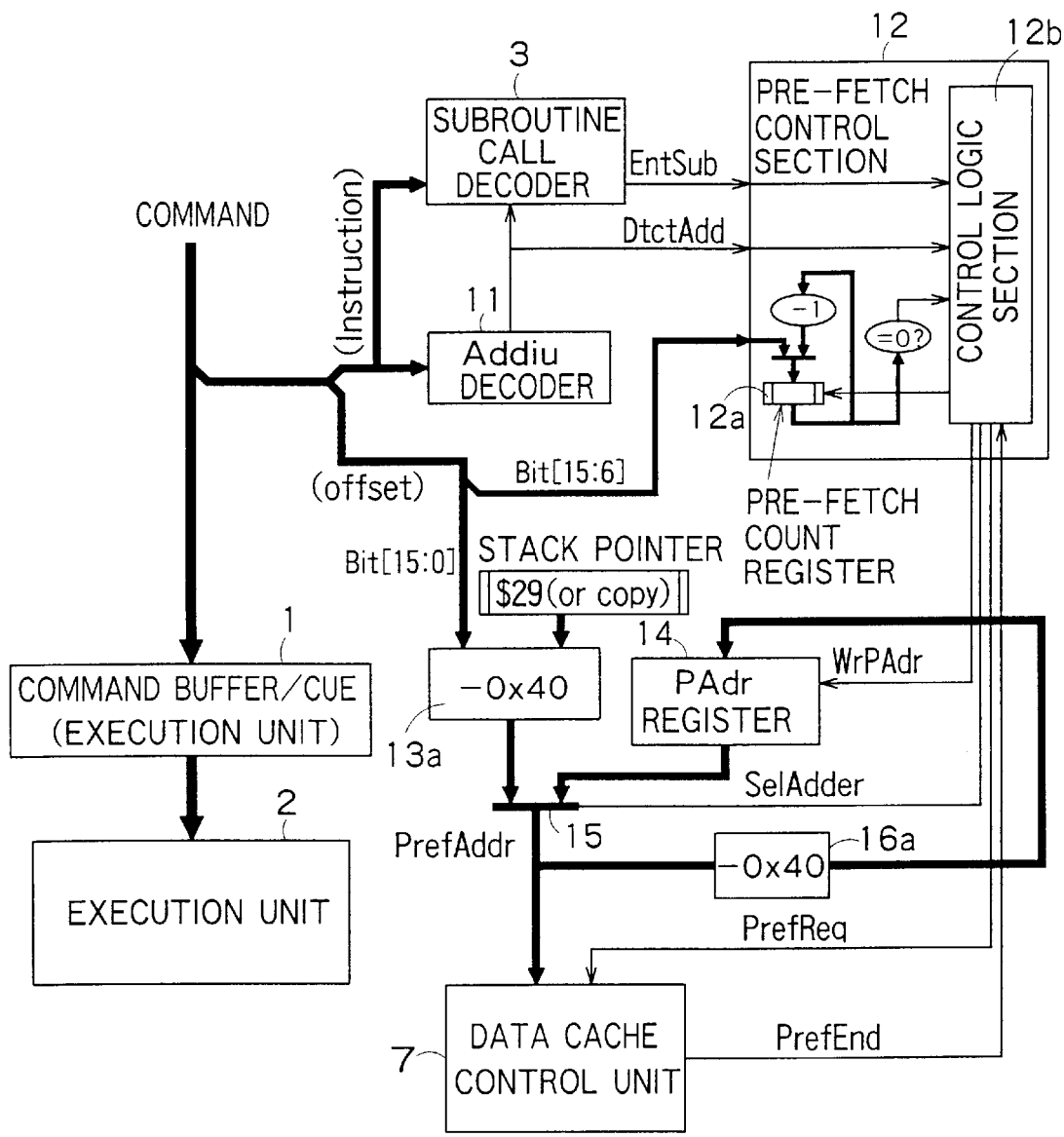
F I G. 4

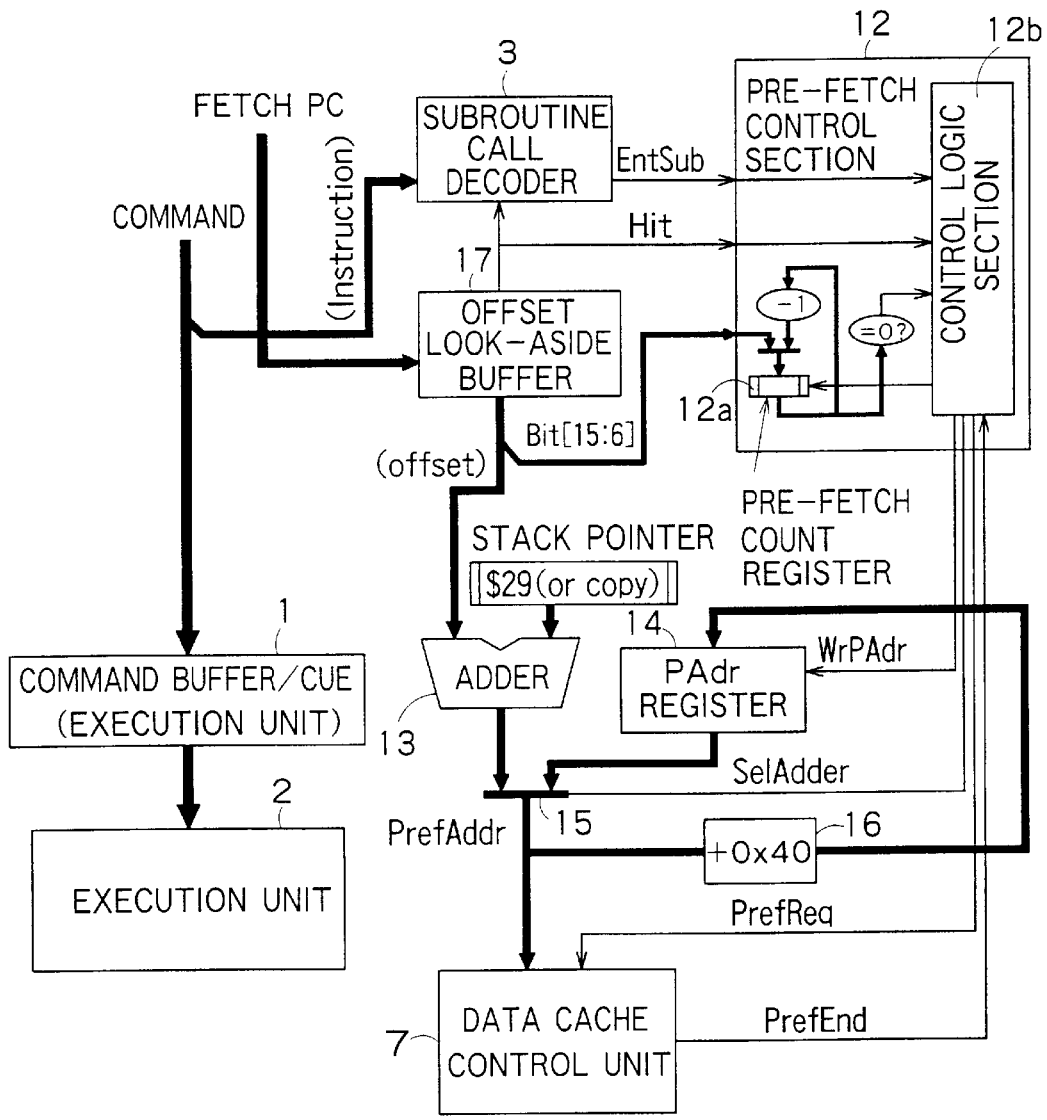
F I G. 6

MICROPROCESSOR AND CACHE CONTROLLING METHOD

CROSS REFERENCE TO RELATED APPLICATIONS

This application is based on the prior Japanese Patent Application Laid-open No. 88972/2000, filed Mar. 28, 2000 in Japan by claiming priority under the Paris Convention.

BACKGROUND OF THE INVENTION (i) Field of the Invention

The present invention relates to a microprocessor provided with a cache memory, and more particularly, it relates to a technique for suppressing reduction in performance caused due to a cache miss.

(ii) Description of the Related Art

In recent years, the speedup of a microprocessor is remarkable, and a difference in operating frequency between an external memory and a processor tends to be large. Therefore, reduction in performance due to access by the external memory has a great influence on the performance of the processor. In order to solve such a problem, there are released a large number of processors having a mechanism for including or adding a cache memory.

When a cache miss occurs, however, data must be obtained from a secondary cache memory or external memory which takes a time for accessing, and hence the processing performance is greatly reduced as compared with a case of a cache hit. In order to suppress reduction in the processing performance at the time of a cache miss, there is proposed a processor having a pre-fetch function.

A pre-fetch command is a command for loading the content of a designated memory into a cache memory, and most of the pre-fetch commands are explicitly issued by an order. By first refilling data which will be required after this command to the cache memory, the command which uses the data can be executed without causing any cache miss if cache refilling is completed in a period between the pre-fetch command and actual use of the data.

In regard to issue of the pre-fetch command, however, there is no best algorithm in the actual condition. In order to hold a cache line for the pre-fetch, it is often the case that any other cache line must be expelled from the cache. At this time, reduction in the performance may possibly occur depending on a frequency and a timing for issuing the pre-fetch. For example, a cache line having data which is often used is expelled by the pre-fetch or expelled by the following pre-fetch before the pre-fetched data is used.

SUMMARY OF THE INVENTION

In view of the above-described problems, it is an object of the present invention to provide a microprocessor capable of suppressing reduction in performance caused due to a cache miss when a specific command is issued.

To achieve this aim, according to the present invention, there is provided a microprocessor comprising:

a cache memory for storing temporarily storing data to be written in an external memory or data read from the external memory;

a variation obtaining portion for obtaining a variation of a value of a register used for a specific application from history information or a subsequent command when a specific command is issued; and a cache refilling portion for executing refilling processing with respect to at least a part of a data area in the cache memory based on the obtained variation.

According to the present invention, when a specific command such as a subroutine call is issued, the refilling processing for the cache memory is executed based on a variation of a value of the register used for a specific application such as a stack pointer, and it is hence possible to reduce the cache miss penalties when executing the specific command.

In particular, the pre-fetch, issue of which command is said to be difficult, is not controlled by hardware, but a stack register whose application is special and whose rewrite timing can be readily predicted by hardware is used. Therefore, a destination of the pre-fetch can be dynamically and accurately predicted, thereby reducing cache miss penalties.

Further, when localization of data in a stack area is called into play and the data does not have to be refilled in the cache, it is set so that the external memory access which is not necessary at the time of pre-fetching data does not occur, and it is thus possible to realize a cache management mechanism which is suitable for a characteristic of the data.

Furthermore, there is provided a microprocessor comprising:

a cache memory for temporarily storing data to be written in an external memory or data read from the external memory;

a next pointer value calculator for calculating a value of a next stack pointer set in a subroutine when a command concerning a call for the subroutine is detected;

a pre-fetch requesting portion for requesting pre-fetch to the cache memory when the command concerning a call for the subroutine is detected; and a cache controller for executing refilling processing of data in units of cache line of the cache memory by using a value calculated by the next pointer value calculator as a starting point when the pre-fetch is requested.

Moreover, there is provided the microprocessor including a cache memory for temporarily storing data to be written in an external memory or data read from the external memory, comprising:

a stack pointer calculator for increasing/decreasing a value of a stack pointer from a value of the stack pointer immediately before the subroutine is called by an amount corresponding to a size of a cache line of the cache memory;

a pre-fetch requesting portion for requesting pre-fetch to the cache memory when a command concerning a call for the subroutine is detected; and a cache controller for executing refilling processing of data by using a value calculated by the stack pointer value calculator as a starting point when the pre-fetch is requested.

BRIEF DESCRIPTION OF THE DRAWINGS

FIG. 3 is a block diagrams showing a schematic structure of a first embodiment of a processor according to the present invention;

FIG. 4 is a block diagram showing an example of executing pre-fetch in an order reversed from that in FIG. 3;

FIG. 6 is a block diagram showing a schematic structure of a third embodiment of a processor according to the present invention.

DESCRIPTION OF THE PREFERRED EMBODIMENTS

Figure 1:
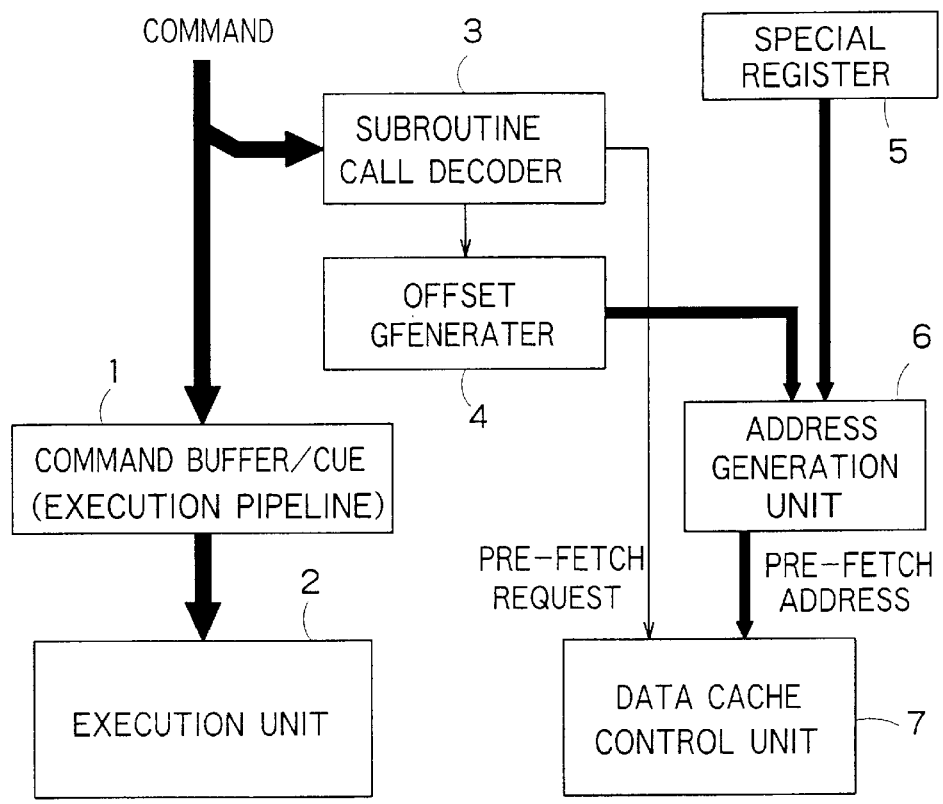
FIG. 1 is a block diagram for explaining a basic principle of the present invention.

A microprocessor according to the present invention will now be specifically described hereinafter with reference to the accompanying drawings. In the following embodiments, an MIPS (Microprocessor without Interlocked Pipeline Stages) type microprocessor will be exemplified.

Specifically, there are 32 general-purpose registers each of which has 32 bits. In these registers, $29 is used as a stack pointer, and $31 is used as a link register for a subroutine call. Further, description will be given as to the case where an example, which includes or adds a data cache having a line size of 64 bytes (16 words), and uses the least significant 6 bits of an address for accessing data as offset on the cache line, will be described as follows.

In general, the MIPS type processor has the following characteristics (1) to (3).

(1) A subroutine call JAL or JALR is used. JAL is a PC relative jump, and JALR is a register indirect jump. The both calls are written in $31 with an address of a next command of a jump delay slot being used as a return address.

(2) Since MIPS does not have a command such as pre-increment or a post-decrement, the number of bytes of a stack used in a subroutine is subtracted from the stack pointer at a head of that subroutine, and the stack pointer is added by the number of bytes used when returning from the subroutine in order to restore the stack pointer. At this time, in most programs, an addiu command (immediate value addition command) involving an immediate value (offset value) of 16 bits is used. It is to be noted that since the stack extends toward the address zero in the memory, a negative value is used as the immediate value.

(3) A memory access command (for example, a load command or a store command) in MIPS is register relative addressing using the offset of 16 bits which follows the memory access command. The operation to the stack is carried out by access using $29 as a base register.

In case of operating the stack pointer, a command other than the addiu command is rarely used. That is because the stack does not become too large to be processed by the addiu command and the offset of the memory access command in MIPS has 16 bits as similar to the addiu command.

(4) Return from the subroutine is executed by JR (JR $31).

(Principle of the Invention)

FIG. 1 is a block diagram for explaining the basic principle of the present invention. A microprocessor shown in FIG. 1 includes a command buffer/queue (or an execution pipeline) 1 for temporarily storing a command read from a non-illustrated command cache, an execution unit 2 for sequentially executing commands, a subroutine call decoder (pre-fetch requesting portion) 3 for detecting whether a subroutine call is generated, an offset generator (variation obtaining portion) 4 for outputting an offset value used by the subroutine with the current stack pointer as a starting point, a special register 5 for storing a stack pointer, an address generation unit (next pointer value calculator) 6 for generating a stack pointer after a subroutine call occurs, and a data cache control unit 7 for executing pre-fetch of data with a stack pointer generated by the address generation unit as a starting point.

Figure 2:
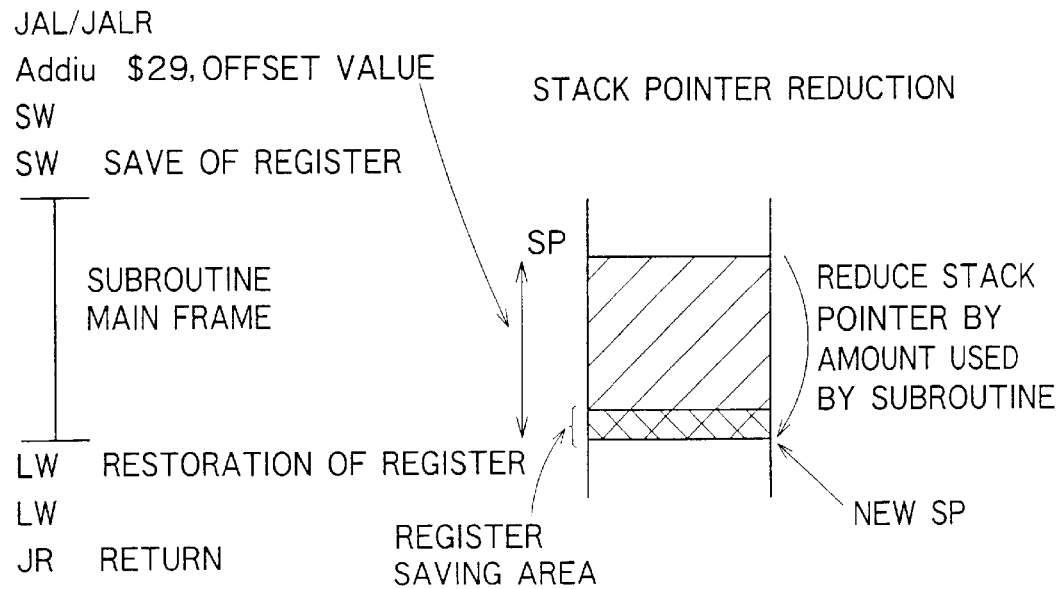
FIG. 2 is a view showing an example of a command string executed by a processor.

FIG. 2 is a view showing an example of a command string executed by the processor and illustrates an example where a JAL command which is a subroutine call is executed.

As shown in FIG. 2, in case of executing the JAL command, an offset value of the addiu command is first subtracted from the stack pointer (value of the register $29) in response to the addiu command which follows the JAL command. This calculation is executed in the address generation unit shown in FIG. 1.

Subsequently, a command in the subroutine is pre-fetched with the calculated stack pointer as a starting point so that the data is pre-loaded in an area (hatched area in FIG. 2) in a cache memory used by the subroutine.

As described above, according to the present invention, the stack pointer is moved by an amount used by the subroutine when the subroutine call occurs, and the data is pre-loaded in an area in the cache memory used by the subroutine, thereby suppressing reduction in performance caused due to a cache miss at the time of executing the subroutine.

(First Embodiment)

The first embodiment is externalization of FIG. 1 and executes pre-fetch in units of cache line of the data cache at the time of the subroutine call.

FIG. 3 is a block diagram showing a schematic structure of a first embodiment of a processor according to the present invention. In FIG. 3, the same reference numerals denote constituent parts common to FIG. 1, and a difference from FIG. 1 will be mainly described hereinafter.

As similar to FIG. 1, the processor in FIG. 3 includes a command buffer/queue 1, an execution unit 2, a subroutine call decoder (pre-fetch requesting portion) 3, and a data cache control unit (cache refilling portion) 4.

Besides, the processor in FIG. 3 also includes an Addiu decoder 11 for detecting an addiu command included in a command string read from a non-illustrated command cache, a pre-fetch control section 12 for controlling pre-fetch, an adder (next pointer value calculator) 13 for adding the current stack pointer stored in the register $29 and an offset value bit [15:0] of the addiu command, a PAdr register 14 for storing an address obtained by adding a cache line size 0x40 of the data cache to the current pre-fetch address calculated by the adder 13, a selector 15 for selecting either the calculation result of the adder 13 and a value of the PAdr register 14, and an adder circuit 16 for increasing the pre-fetch address which is an output from the selector 15 by only the cache line 0x40.

The operation of the processor shown in FIG. 3 will now be explained. When the subroutine call decoder 3 detects a subroutine command (for example, a JAL/JALR command), a signal EntSub indicating execution of the subroutine call is asserted. With the signal EntSub being asserted, when an Addiu command following the subroutine command is detected by the decoder 11, the Addiu decoder 11 asserts a signal DtctAdd. It is to be noted that the signal EntSub signal keeps being asserted until the signal DtctAdd is detected or the JR command indicative of return from the subroutine is detected after detection of the JAL/JALR command.

At the moment that the pre-fetch control section 12 detects that these two types of signals EntSub, DtctAdd are asserted, sequencing of the pre-fetch is started.

A pre-fetch count register (line number measuring portion) 12a in the pre-fetch control section 12 first stores a value obtained by inverting the most significant bit string bit [15:6] of the offset value of the addiu command. The stack pointer operation at the head of the subroutine is addition of a negative number, and the least significant six bits in the address are the offset on the cache line. Therefore, a complement of 1 of an immediate value bit [15:6] is the number of cache lines which should be cache-loaded by the pre-fetch.

Further, the pre-fetch control section 12 causes the selector 15 to select an output of the adder 13 by controlling a signal SeLAdder and requests issue of a pre-fetch access to the data cache control unit 7 by controlling a signal PrefReq.

The data cache control unit 7 first confirms whether the requested cache line exists in the data cache, and immediately terminates pre-fetch if the cache line exists. Further, if the cache line does not exists, the data cache control unit 7 usually accesses to an external memory or a secondary cache to execute the refilling processing of the data cache. Furthermore, when the pre-fetch is completed or next pre-fetch can be accepted, the data cache control units 7 asserts a signal PrefEnd.

When the signal PrefEnd is asserted, the register value of the pre-fetch count register 12a is decremented by 1. A control logic section 12b in the pre-fetch control section 12 asserts a signal WrPAdr and stores in the PAdr register 14 a number obtained by adding the cache line size 0×40 to the current pre-fetch address. At this time, the pre-fetch control section 12 confirms whether the pre-fetch count register 12a is zero, and terminates the operation of the pre-fetch if it is zero. If not zero, the selector 15 is caused to select a value of the PAdr register 14 by controlling the signal SelAddr, and the signal PrefReq is similarly asserted to request the next pre-fetch.

Thereafter, as similar to the operation of first pre-fetch, updating of the pre-fetch count register 12a and updating of the PAdr register 14 are carried out when the signal PrefEnd is asserted. Judgment is then made upon whether the next pre-fetch is executed based on a value of the pre-fetch count register 12a.

The operation of the above-described control logic section 12b is forcibly terminated when the signal EntSub from the subroutine call decoder 3 is de-asserted. Consequently, after entering the subroutine, if execution of the subroutine is terminated before completing the pre-fetch in the stack area, the pre-fetch is no longer continued.

As described above, in the first embodiment, the stack pointer is moved by an amount used in the subroutine when the subroutine calls occurs, and the data used in the subroutine is pre-fetched to be stored in an area in the data cache used by the subroutine. Therefore, cache miss penalties due to the stack access which can readily occur at the time of the subroutine call can be reduced, thereby improving the performance of the processor.

In particular, as seen in a recent super color processor, if a processor has a command queue between a command fetch section and a command execution section and has a relatively long latency from fetching a command to issuing a command to the pipeline, a period from detection of the subroutine call to actual execution of the stack operation can be long. Thus, reduction in the performance due to cache miss can not be efficiently suppressed.

Incidentally, an example of implementation in case of executing the pre-fetch from an address close to an address 0 of the stack used by the subroutine to be called has been described in this embodiment but, on the contrary, it comes natural to execute the pre-fetch starting from an address far from the address 0 of the stack in the subroutine to be called, i.e., from an address close to a value of the stack pointer of a parent function toward the address 0. FIG. 4 is a view showing this example of implementation, in which an subtracter 13a for subtracting 0×40 as the line size from the current stack pointer value substitutes for the adder 13 and a subtracter 16a is provided in place of the adder 16 circuit. The number of times of executing the pre-fetch is the same as that in FIG. 3, and the control circuit is hence constituted similarly as to that in FIG. 3.

(Second Embodiment)

The second embodiment is a modification of the first embodiment. In the second embodiment, when it is apparent that data to be pre-fetched is used only for the stack operation in the subroutine and not used in any other subroutine, reading data from the memory aiming at the refilling operation of the data cache is not carried out but only registration to a cache tag is executed.

Figure 5:
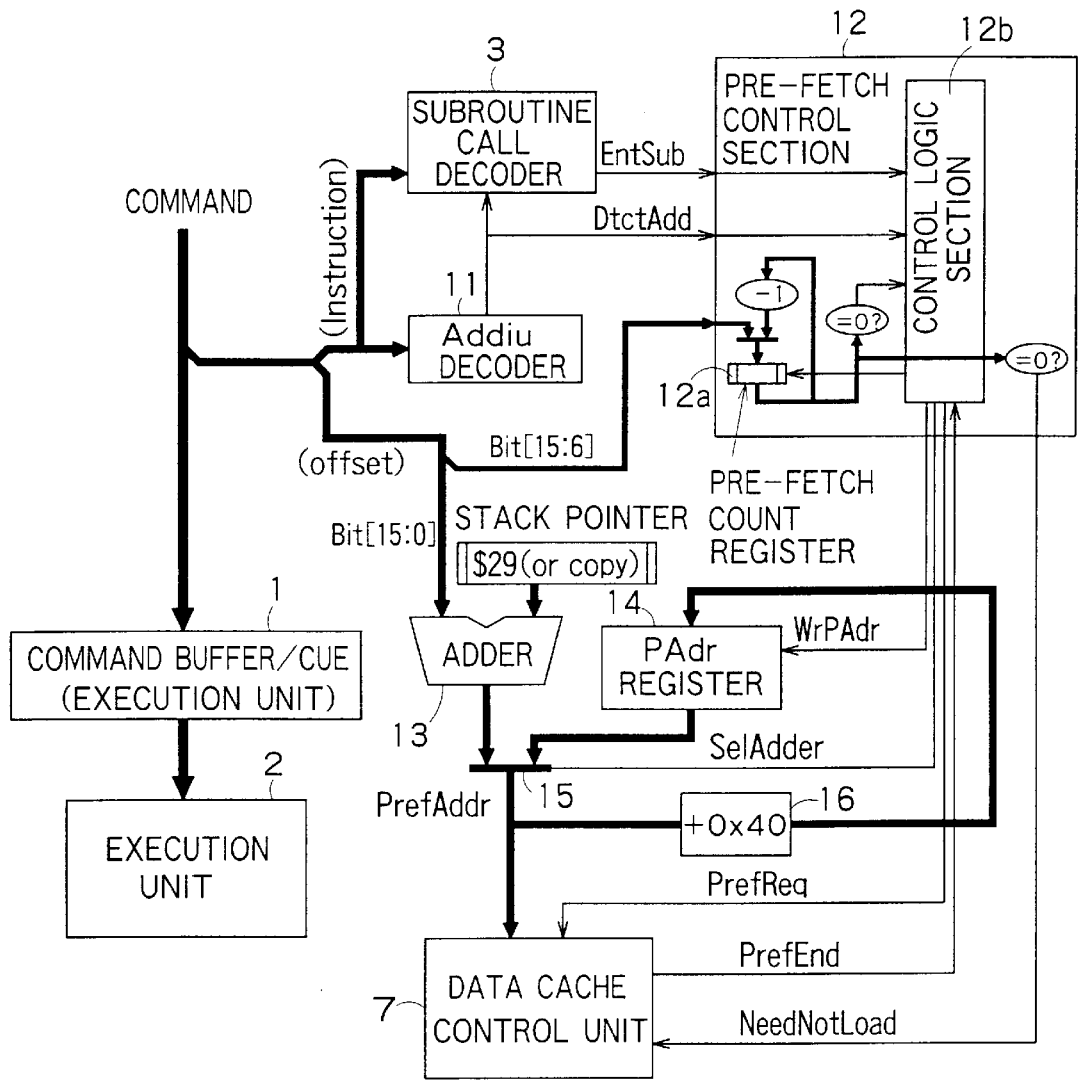
FIG. 5 is a block diagram showing a schematic structure of a second embodiment of a processor according to the present invention.

FIG. 5 is a block diagram showing a schematic structure of the second embodiment of the processor according to the present invention. In FIG. 5, the same reference numerals denote constituent parts common to FIG. 3, and a difference from FIG. 3 will be mainly explained hereinafter.

The processor in FIG. 5 is characterized in supply of a signal NeedNotLoad prohibiting the refilling operation of the data cache under predetermined conditions from the pre-fetch control section 12 to the data cache control unit 7. This signal NeedNotLoad is asserted when a value of the pre-fetch count register 12a is not 1.

When the signal NeedNotLoad is asserted, the data cache control unit 7 does not read data from the external memory but rewrites only tag information of the data cache. Consequently, the refilling operation for the cache lines does not have to be immediately carried out, which further reduces penalties owing to cache refilling.

Such processing is executed because the following stack properties (1) to (3) are mainly used.

(1) A pre-fetch request by the signal PrefReq from the pre-fetch control section 12 to the data cache control unit 7 is necessarily designated to the stack.

(2) In between the subroutine A and the subroutine B called by the subroutine A, only data used by the subroutine B exists between an address indicated by the stack pointer in the subroutine A and an address indicated by the stack pointer in the subroutine B, and the subroutine A or a parent function which called the subroutine A does make reference to the data in this area.

(3) The lower limit of the stack in the subroutine A and the upper limit of the stack in the subroutine B may possibly exist in the same line, and this cache line, namely, the last line of the stack used by the subroutine B must be refilled with data except that a value of the stack pointer in the subroutine A is aligned with the cache line. It is, however, guaranteed that the stack at any lower-numbered address is not used by any part of the program (or previously used but reference is no longer made to the data on the program). Further, as to the memory access to this part, reading must be carried out after writing because of the stack properties, and reading is never performed at first.

As described thus far, data management in the stack is different from that in a usual memory, and data stored in a lower-numbered address than an area used by a function which is currently executed does not have meaning. In particular, when that function is called, the data stored at an address whose number is lower than that of an address indicated by a value of the parent stack pointer has no meaning.

However, since control of the stack pointer is independent from the line size of the cache line, the stack pointer may indicate the middle of the cache line.

In light of the above description, the second embodiment obtains from the external memory only data of an uppermost line in a stack area of the current function which can possibly overlap on a stack area of the parent function and generates the cache line on the memory without obtaining data from the external memory since it is apparent that rewriting is carried out in the lower lines.

There are several methods for detecting overlap of the stack area of the parent function and the stack area of the currently-executed function. For example, if [5:0] of the stack pointer value in the parent function are all zeros, this corresponds to the head of the cache line, and it is hence apparent that there is no overlap of the stack of the subroutine to be called on the cache line of the parent function and at the boundary between these functions. Further, it is apparent from the stack properties that there is no overlap at lower-numbered addresses.

On the contrary, since there is overlap if [5:0] of the value of the stack pointer are not all zeros, the uppermost line in the stack area of the function to be called must be refilled with data. However, lines at lower-numbered addresses do not have to be refilled with data as described above. The stack boundary with the parent function is, for example, a line which is refilled last in this embodiment, namely, this is the case when the pre-fetch count register is 0. Moreover, in implementation where the pre-fetch is executed from the upper part toward the lower part of the stack, this is the line in which the pre-fetch is initially executed.

In this embodiment, this detection of 0 is omitted, and the pre-fetch involving data refilling is issued for the part which contacts with the stack area of the parent function, i.e., the line in which the pre-fetch is performed last (pre-fetch counter register is 0) irrespective of a position of the stack pointer.

Providing a signal NeedNotLoad such as shown in FIG. 5 can effectively reduce penalties of cache refilling when executing a program using the stack relatively extensively such as a function having a number of local variables.

(Third Embodiment)

The third embodiment looks ahead to an offset value of a stack specified at the time of a subroutine call.

FIG. 6 is a block diagram showing a schematic structure of the third embodiment of a processor according to the present invention. In FIG. 6, the same reference numerals denote constituent parts common to FIG. 3, and a difference from FIG. 3 will be mainly explained hereinafter.

The processor in FIG. 6 is provided with an offset look-aside buffer (offset obtaining portion) 17 for looking ahead to an offset value of the stack when executing a command (for example, a jump command JAL/JALR) for performing a subroutine call. The offset look-aside buffer 17 operates in parallel with the subroutine call decoder 3 and detects an offset value of the addiu command following the JAL/JALR command.

When the offset look-aside buffer 17 hits, i.e., when an offset value is detected and a hit signal is asserted, it is informed the subroutine call decoder 3, and the signal EntSub indicative of execution of the subroutine call is asserted. It is to be noted that the signal EntSub keeps being asserted until the subroutine call decoder 3 detects the command JR.

When the pre-fetch control section 12 detects that the signal EntSub is asserted, sequencing of the pre-fetch is started.

A value obtained by inverting the most significant bit string bit [15:6] of the offset value outputted from the offset look-aside buffer 17 is first stored in the pre-fetch count register 12a.

A negative number is added in the stack pointer operation at the head of the subroutine. Further, since the least significant six bits are the offset of the cache line, a complement of 1 of the most significant bit string bit [15:6] of the offset value becomes the number of cache lines in which cache loading should be carried out by the pre-fetch.

The pre-fetch control section 12 causes the selector 15 to select an output of the adder 13 by controlling the signal SelAdder. Furthermore, the pre-fetch control section 12 requests issue of the pre-fetch access to the data cache control unit 7 by the signal PrefReq.

When the pre-fetch is completed or when the next pre-fetch can be accepted, the data cache control unit 7 asserts the signal PrefEnd.

When the signal PrefEnd is asserted, the pre-fetch count register 12a subtracts the register value by 1. Furthermore, the pre-fetch control section 12 asserts a signal WrPAdr and stores in the register 14 a number obtained by adding the cache line size 0x40 to the current pre-fetch address. The pre-fetch control section 12 confirms whether the pre-fetch count register 12a is zero. If zero, the pre-fetch operation is terminated.

If the pre-fetch count register 12a is not zero, the pre-fetch control section 12 causes the selector 15 to select a value of the PAdr register 14 by controlling the signal SelAddr. In addition, the signal PrefReq is asserted to request the next pre-fetch.

Subsequently, as similar to the first pre-fetch operation, the pre-fetch count register 12a and the PAdr register 14 are updated when the signal Pref End is asserted, and judgment is made upon whether the next pre-fetch is executed based on a value of the pre-fetch count register 12a.

The above-described operation of the pre-fetch control section 12 is forcibly terminated when the signal EntSub is de-asserted. As a result, after entering the subroutine, when execution of the subroutine is terminated before the pre-fetch in the stack area is completed, the pre-fetch is no longer continued.

As described above, since the third embodiment looks ahead to the offset value of the stack specified at the time of the subroutine call, a cache area used in the subroutine can be rapidly detected, thereby performing the cache refilling operation in a short period of time.

In this connection, penalties of cache refilling can be likewise further reduced in the third embodiment by supplying the signal NeedNodLoad which is the same as that in FIG. 5 from the pre-fetch control section 12 to the data cache control unit 7.

(Fourth Embodiment)

The fourth embodiment performs the refilling operation for the cache line without obtaining an offset value at the time of a subroutine call.

Figure 7:
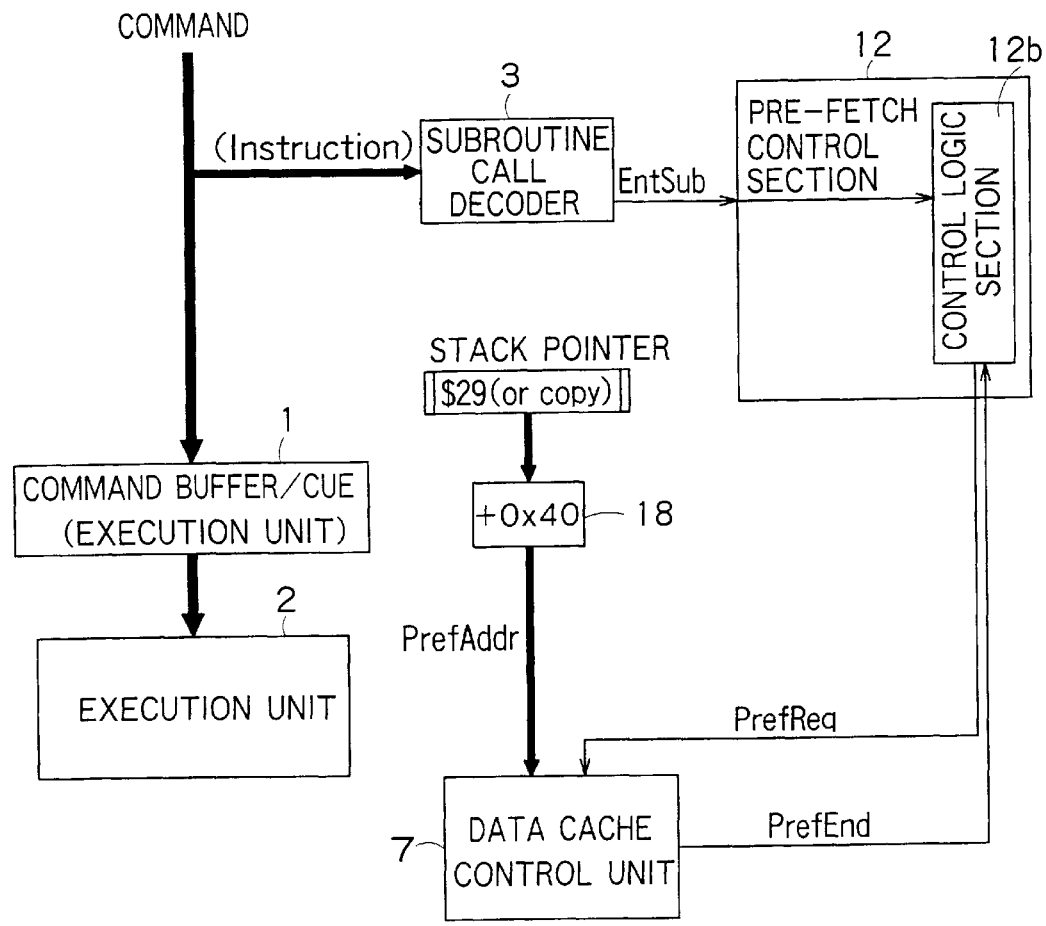
FIG. 7 is a block diagram showing a schematic structure of a fourth embodiment of a processor according to the present invention.

FIG. 7 is a block diagram showing a schematic structure of the fourth embodiment of the processor according to the present invention. In FIG. 7, the same reference numerals denote constituent parts common to FIG. 3, a difference from FIG. 3 will be mainly described hereinafter.

As compared with FIG. 3, the processor shown in FIG. 7 eliminates the Addiu decoder 11, the PAdr register 14 and the adder 13 and, on the other hand, provides a subtracter (stack pointer calculator) 18 for subtracting the address value 0x40 corresponding to the cache line size from a value of the stack pointer. Further, in the processor illustrated in FIG. 7, the pre-fetch control section 12 is also simplified, and the pre-fetch count register 12a is eliminated.

In FIG. 7, when a command for carrying out the subroutine call (for example, the command JAL/JALR) is detected, the subroutine call decoder 3 asserts the signal EntSub. When the pre-fetch control section 12 detects that the signal EntSub is asserted, sequencing of the pre-fetch is started.

A value obtained by subtracting 0x40 from the current value of the stack pointer is first inputted to the data cache control unit 7 as a pre-fetch address. Additionally, when the command for carrying out the subroutine call is detected, the subroutine call decoder 3 asserts the signal EntSub. The pre-fetch control section 12 asserts the signal PrefReq indicative of start of the pre-fetch when the signal EntSub is asserted. When the pre-fetch is completed or the next pre-fetch can be accepted by the fact that the signal PrefReq is asserted, the data cache control unit 7 asserts the signal PrefEnd.

Although improvement in performance can not be greatly expected in the fourth embodiment as compared with the first to third embodiments, the pre-fetch can be efficiently issued with respect to a part having a high probability that the processor accesses with the very simple circuit.

Therefore, in the processor which places importance to the memory efficiency such as a relatively small scale processor, the number of memory areas that one function uses is not very large, and it is often the case that the stack operation is performed to one cache line by and large. Thus, the fourth embodiment demonstrates the effect in such a case.

Moreover, in the fourth embodiment, when the least significant six bits are all zeros as a result of calculating a pre-fetch destination, the pre-fetch destination and the current stack pointer are stored in different cache lines. Therefore, by adding the circuit for detecting that the least significant six bits are all zeros, cache refilling from the external memory doesn't have to be immediately performed, thereby further improving the performance of cache refilling.

Incidentally, taking the above-described first to fourth embodiments into consideration, optimizing mapping of the stack by a compiler can further improve the performance of cache refilling.

What is claimed is:

1. A microprocessor, comprising:
    a cache memory for temporarily storing data to be written in an external memory or data read from said external memory;
    a next pointer value calculator for calculating a value of a next stack pointer set in a subroutine when a command concerning a call for said subroutine is detected;
    a pre-fetch requesting portion for pre-fetching a data area that is to be used by instructions of said subroutine called by said command concerning a call for said subroutine;
    a cache controller for performing data refilling processing in units of cache line in said cache memory by using said value calculated by said next pointer value calculator as a starting point when the pre-fetch is required; and
    an instructing portion for instructing a cache memory to execute registration to a cache tag without performing data refilling processing for a cache line when all data on said cache line to be pre-fetched are used only for a stack operation in a corresponding subroutine but not used in any other subroutine.

2. The microprocessor according to claim 1 further comprising a line number measuring portion for measuring the number of pre-fetched cache lines,
    wherein said instructing portion determines whether data refilling processing for said cache line is performed based on the number of cache lines measured by said line number measuring portion.

3. A cache controlling method for a microprocessor including a cache memory for temporarily storing data to be written in an external memory or data read from said external memory, said method comprising the steps of:
    calculating a value of a next stack pointer set in a subroutine when a command concerning a call for said subroutine is detected;
    pre-fetching data area that is to be used by instructions of said subroutine called by said command concerning a call for said subroutine;
    performing data refilling processing in units of cache line in said cache memory by using said calculated value of a next stack pointer as a starting point when the pre-fetch is requested; and
    instructing said cache memory to execute registration to a cache tag without performing data refilling processing for a cache line when all data on said cache line to be pre-fetched are used only for a stack operation in a corresponding subroutine but not used in any other subroutine.

4. The cache controlling method according to claim 3, further comprising a step of measuring the number of pre-fetched cache lines,
    wherein said step of instructing to perform registration to said cache tag determines whether data refilling processing for a cache line is performed based on said measured number of cache lines.

5. A microprocessor, comprising:
    a cache memory for temporarily storing data to be written in an external memory or data read from said external memory;
    a next pointer value calculator for calculating a value of a next stack pointer set in a subroutine when a command concerning a call for said subroutine is detected;
    a pre-fetch requesting portion for pre-fetching data area that is to be used by said subroutine called by said command concerning a call for said subroutine;
    a cache controller for performing data refilling processing in units of cache line in said cache memory by using said value calculated by said next pointer value calculator as a starting point when the pre-fetch is required; and
    an instructing portion for instructing a cache memory to execute registration to a cache tag without performing data refilling processing for a cache line when all data on said cache line to be pre-fetched are used only for a stack operation in a corresponding subroutine but not used in any other subroutine.

6. The microprocessor according to claim 5, further comprising a line number measuring portion for measuring the number of pre-fetched cache lines,
    wherein said instructing portion determines whether data refilling processing for said cache line is performed based on the number of cache lines measured by said line number measuring portion.

7. A cache controlling method for a microprocessor including a cache memory for temporarily storing data to be written in an external memory or data read from said external memory, said method comprising the steps of:

calculating a value of a next stack pointer set in a subroutine when a command concerning a call for said subroutine is detected;

pre-fetching data area that is to be used by said subroutine called by said command concerning a call for said subroutine;

performing data refilling processing in units of cache line in said cache memory by using said calculated value of a next stack pointer as a starting point when the pre-fetch is requested; and instructing said cache memory to execute registration to a cache tag without performing data refilling processing for a cache line when all data on said cache line to be pre-fetched are used only for a stack operation in a corresponding subroutine but not used in any other subroutine.

8. The cache controlling method according to claim 7, further comprising a step of measuring the number of pre-fetched cache lines, wherein said step of instructing to perform registration to said cache tag determines whether data refilling processing for a cache line is performed based on said measured number of cache lines.

* * * * *